United States Patent [19]
Okaguchi et al.

[11] Patent Number: 5,895,999
[45] Date of Patent: *Apr. 20, 1999

[54] VIBRATING GYROSCOPE

[75] Inventors: Kenjiro Okaguchi, Shiga-ken; Yukio Sakashita, Toyama, both of Japan

[73] Assignee: Murata Manufacturing Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/658,729

[22] Filed: Jun. 5, 1996

[30] Foreign Application Priority Data

Jun. 7, 1995 [JP] Japan .................. 7-140665

[51] Int. Cl.$^6$ .................. H01L 41/053; G01P 9/00
[52] U.S. Cl. .................. 310/367; 310/348; 73/504.14
[58] Field of Search .................. 310/321, 348, 310/367; 73/504.14, 504.12, 504.17

[56] References Cited

U.S. PATENT DOCUMENTS

| | | | |
|---|---|---|---|
| 2,882,748 | 4/1959 | Parstorfer | 77/581 |
| 5,345,822 | 9/1994 | Nakamura et al. | 73/505 |
| 5,521,456 | 5/1996 | Mori et al. | 310/326 |
| 5,557,045 | 9/1996 | Ishitoko et al. | 73/504.14 |
| 5,569,969 | 10/1996 | Kasanami et al. | 310/345 |

FOREIGN PATENT DOCUMENTS

| | | | |
|---|---|---|---|
| 520467 | 12/1992 | European Pat. Off. | |
| 0553718 | 1/1993 | European Pat. Off. | G01C 19/56 |
| 53-70788 | 6/1978 | Japan | 310/348 |
| 4-222109 | 8/1992 | Japan | 310/348 |
| 6-74773 | 3/1994 | Japan | 73/504.12 |

OTHER PUBLICATIONS

"Flexible Mounting For Vibration Isolation", R.E. Jelinek, Jr., IBM Technical Disclosure Bulletin, vol. 14, No. 6, Nov. 1971.

*Primary Examiner*—Thomas M. Dougherty
*Attorney, Agent, or Firm*—Ostrolenk, Faber, Gerb & Soffen, LLP

[57] ABSTRACT

A vibrating gyroscope has a mounting substrate carrying a vibrator. The mounting substrate is supported and fixed by a plurality of connecting members at a level above a circuit board. The supporting members also provide electrical connection between a wiring on the mounting substrate and a circuitry including an oscillation circuit and a detection circuit on the circuit board. Each connecting member has one end fixed to a point on the mounting substrate substantially in the middle of the path of propagation of vibration which is between supporting pins and which detours around a slit formed in the mounting substrate.

6 Claims, 2 Drawing Sheets

VIBRATING GYROSCOPE

BACKGROUND OF THE INVENTION

1. Field of the Invention

The present invention relates to a vibrating gyroscope suitable for use, for example, in a navigation system which adequately guides a moving object upon detection of the position of the moving object through sensing rotation angular velocity, or in an anti-vibration system such as an anti-shaking device which adequately performs vibration suppression upon detection of rotational angular velocity caused by an externally given vibration such as shaking by a hand.

2. Description of the Related Art

Construction of a conventional vibrating gyroscope will be described with reference to FIGS. 1 and 2. FIG. 1 shows a vibrating gyroscope 21 having a vibrator 2, a mounting substrate 3, supporting pins 4, a supporting plate 5, a circuit board 6, connecting members 7 and buffer members 8.

The vibrator 2 is made of a material capable of performing mechanical vibration such as a permanently elastic metallic material, e.g., elinvar, quartz, glass, ceramics or the like, and has a pillar-like configuration with a regular-triangular cross-section. As will be best seen from FIG. 2, piezoelectric elements 9 and 10 used for driving and detection are attached by, for example, bonding to two adjacent side faces of the vibrator 2. To the remainder of the three faces of the vibrator 2, a piezoelectric element 11 for feedback is attached also by, for example, bonding.

The mounting substrate 3 has a substantially rectangular form having an H-shaped slit 12 which is provided through the substrate 3. The mounting substrate 3 also has four supporting-pin receiving holes 13 formed therein at positions adjacent to the ends of the slit 12, and projection receiving holes 14 located adjacent to both sides of the slit 12.

The vibrator 2 is fixed on the mounting substrate 3 through the intermediary of the supporting pins 4 which are arranged in a pair. Each supporting pin 4 is made of a wire and has a substantially U-shaped configuration. The supporting pins are bonded at mid portions thereof to portions of the vibrator 2 near two nodes of the vibrator 2, with both ends thereof received and fixed in the supporting-pin receiving holes 13. In this state, the vibrator 2 and the piezoelectric elements 9 to 11 are connected by, for example, wire bonding to a wiring (not shown) laid on the mounting substrate 3.

The mounting substrate 3 carrying the vibrator 2 is disposed above the supporting plate 5. The supporting plate 5 has a substantially rectangular form and is provided with a pair of legs 5a at each longitudinal end thereof. The supporting plate 5 also has a pair of projections 5c corresponding to the projection receiving holes 14 formed in the mounting substrate 3 and each continuing from and to a pair of notches 5b. The legs 5a are orthogonally bent downward, while the projections 5c are orthogonally bent upward. The mounting substrate 3 is fixed to the supporting plate 5 so as to oppose the latter across a gap, with the projections 5c received in the projection receiving holes 14.

The circuit board 6 lies beneath the supporting plate 5, through the intermediary of a pair of buffer members 8. The circuit board 6 has an oscillation circuit (not shown) for applying a driving signal to the vibrator 2 and a detecting circuit (not shown) for detecting angular velocity at which the vibrator 2 oscillatorily rotates. Each buffer member 8 is formed from an elastic material such as TEFLON® polytetrafluoroethylene and has a pillar-like configuration. The buffer members 8 are placed between the respective pairs of legs 5a of the supporting plate 5 and the circuit board 6. The supporting plate 5 and the circuit board 6 are thus fixed together so as to face each other across a gap due to the interposition of the buffer members 8.

A plurality of connecting members 7 are formed by, for example, wire bonding. One end of each connecting member 7 is fixed to the portion of the wiring (not shown) on the mounting substrate 3 at a region near the supporting-pin receiving hole 13, while the other end of the connecting member 7 is connected to a wiring on the circuit board 6, whereby the piezoelectric elements 9 to 11 on the vibrator 2 are electrically connected to the oscillation circuit and the detection circuit.

A driving signal is supplied to the piezoelectric elements 9 and 10 by an oscillation circuit, so that the vibrator 2 vibrates under a bending mode in the direction perpendicular to the surface on which the piezoelectric element 9 is disposed or in the direction perpendicular to the surface on which the piezoelectric element 10 is disposed while the vibration of the vibrator 2 creates two nodes in the vicinity of the portion where the supporting pins 4 holds the vibrator 2. A rotation of the vibrator 2 about an axis 15 causes the direction of the vibration of the vibrator 2 to change to the direction which is perpendicular to the surface on which the piezoelectric element 11 is disposed. The difference between the output voltages from the piezoelectric elements 9 and 10 is detected in this state and based on the value of the difference, the angular velocity of rotation of the vibrator 2 is detected by the detection circuit.

During the vibration under a bending mode of the vibrator 2, the vibration may propagate from one of the two nodes to the other of the nodes via the supporting pins 4 and the mounting substrate 3. Such propagation may interfere with the original vibration of the vibrator 2 and reduce the amplitude of vibration of the vibrator 2. In the vibrating gyroscope 21, however, the slit 12 provides an enlarged path for propagation of vibration, thus suppressing the tendency that the vibration transmitted from the vibrator 2 is propagated from one to the other and vice versa of the pair of supporting pins 4. This eliminates the aforementioned problem of failing to obtain expected amplitude of vibration of the vibrator 2, thus suppressing degradation of performance of the vibrating gyroscope.

The vibrating gyroscope 21 has nevertheless a drawback in that there arises a still possibility to reduce the amplitude of the vibrator 2, which result in degradation of the characteristics of the vibrating gyroscope. According to investigations of the inventors of the present invention, this is because the vibration transmitted from the vibrator 2 to the supporting pin 4 is undesirably propagated to the circuit board 6 through the connecting members 7.

Furthermore, it is necessary to interpose the supporting plate 5 and the buffer members 8 between the mounting substrate 3 and the circuit board 6, requiring an increased number of steps of the assembly process.

SUMMARY OF THE INVENTION

It is therefore an object of the present invention to provide a vibrating gyroscope which has a construction capable of suppressing propagation of vibration from the vibrator to the circuit board and which eliminates the necessity for providing a supporting plate and buffer members between the mounting substrate and the circuit board.

A vibrating gyroscope according to the present invention includes a vibrator and a pair of supporting pins secured to portions of the vibrator near the nodes of vibration of the vibrator to support the vibrator. The vibrating gyroscope further includes a mounting substrate to which the pair of supporting pins are attached, a circuit board, and a plurality of connecting members. The mounting substrate has a slit provided through the mounting substrate, the slit providing a longer propagation path between points where the pair of supporting pins are attached than a distance between the points. The plurality of connecting members are connected at their one ends to the mounting substrate and at their other ends to the circuit board. The mounting substrate is supported and fixed in spaced relationship to the circuit board by only the plurality of connecting members, each of the connecting members having one end fixed to a point on the mounting substrate substantially in the middle of the propagation path.

In one embodiment of the invention, the slit has an H-shape and the circuit board has an oscillation circuit for vibrating the vibrator and a detection circuit for detecting angular velocity of rotation of the vibrator.

The supporting and fixing of the mounting substrate at a level above the circuit board only by the connecting members eliminates the necessity for the provision of a supporting plate and buffer members between the mounting substrate and the circuit board, thus reducing the number of parts and steps of the assembly process. In addition, because the end of the connecting member is fixed at a point which is substantially in the middle of the propagation path, it is at a point which is farthest from the supporting pins along the vibration propagation path on the mounting substrate, thereby suppressing the aforementioned vibration leakage which is the phenomenon that the vibration transmitted from the vibrator to the supporting pins is further propagated to the circuit board through the connecting members. This suppresses the problem of failure to obtain the expected amplitude of vibration of the vibrator and consequent degradation of performance of the vibrating gyroscope, which otherwise may occur due to the vibration leakage.

Other features and advantages of the present invention will become apparent from the following description of the invention which refers to the accompanying drawings.

DETAILED DESCRIPTION OF A PREFERRED EMBODIMENT

Figure 1:
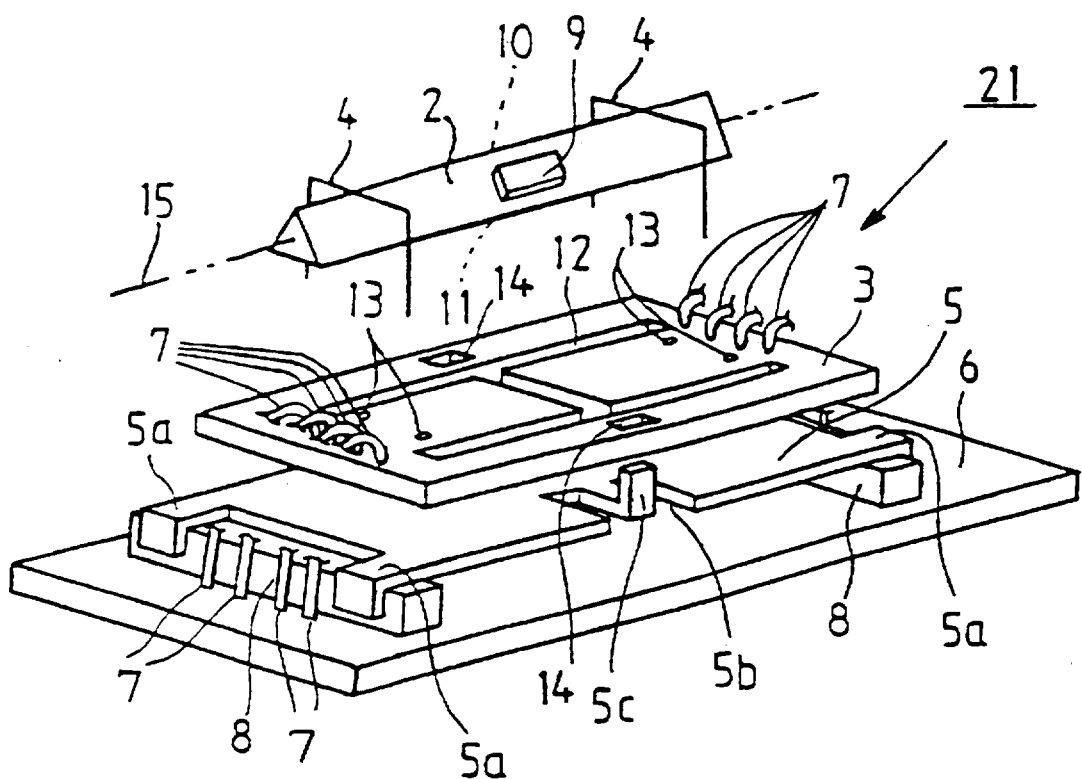
FIG. 1 is an exploded perspective view of a conventional vibrating gyroscope.

Hereinafter, a preferred embodiment of the present invention will be explained in detail with reference to the drawings. The same reference numerals are used to denote the same or corresponding elements as those used in the description of the known art.

Figure 3:
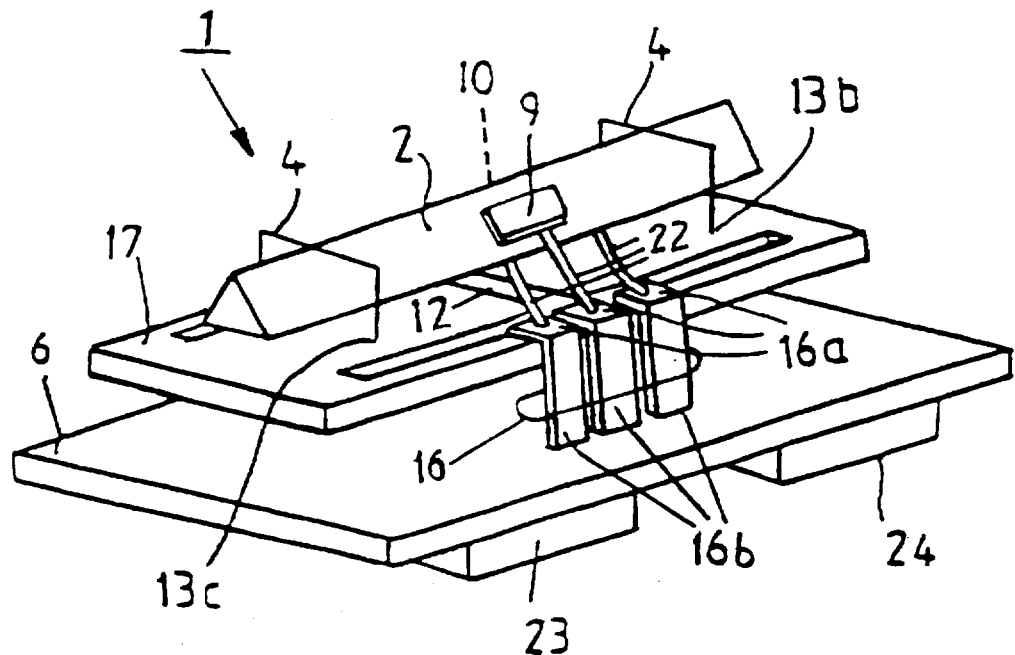
FIG. 3 is a perspective view of a vibrating gyroscope according to a preferred embodiment of the present invention.

FIG. 3 shows a perspective view of a vibrating gyroscope 1 according to the preferred embodiment of the present invention. The vibrating gyroscope 1 includes a vibrator 2, a mounting substrate 17, supporting pins 4, a plurality of connecting members 16, and a circuit board 6.

Figure 2:
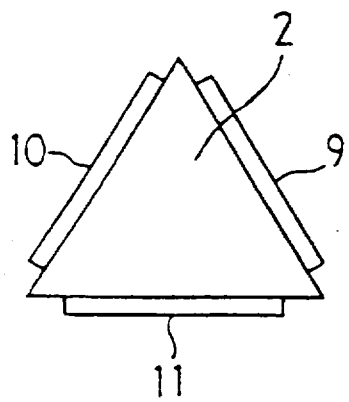
FIG. 2 is an end view of a vibrator incorporated in the vibrating gyroscope as shown in FIG. 1.

The vibrator 2 has three piezoelectric elements 9, 10, and 11 and has the same structure as explained with reference to FIGS. 1 and 2.

Figure 4:
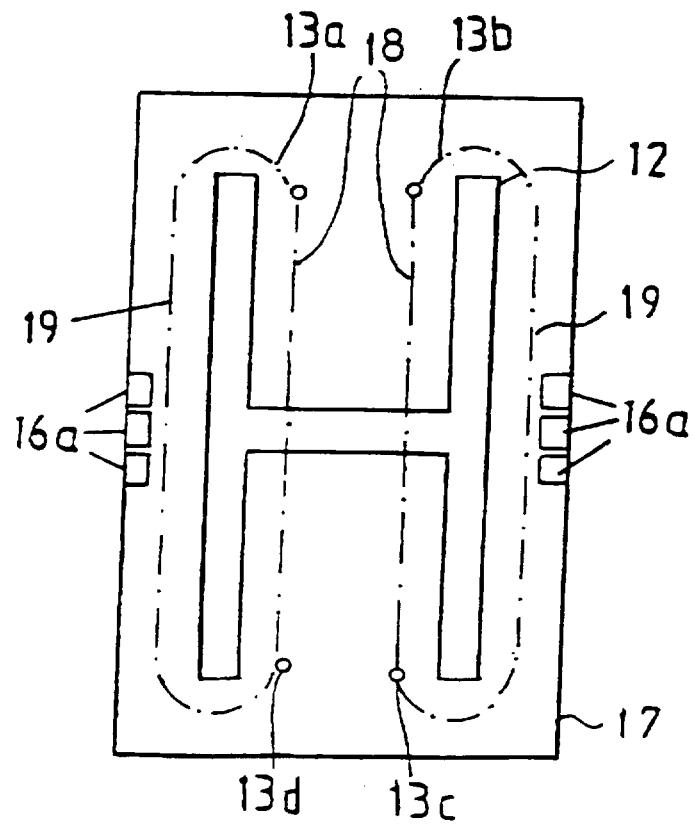
FIG. 4 is a top view of a mounting substrate used in the vibrating gyroscope according to the preferred embodiment of the present invention.

The mounting substrate 17 has a substantially rectangular shape having an H-shaped slit 12 through the substrate 3. More specifically, as shown in FIG. 4, two straight lines of the slit 12 are disposed along and in the vicinity of a pair of longer sides of the mounting substrate 17, respectively and another straight line connects the two lines at the middle of the two lines in parallel with the shorter sides of the mounting substrate 17, thereby constituting the H-shaped slit 12. The mounting substrate 17 also has four supporting-pin receiving holes 13a to 13d formed therein at positions adjacent to the ends of the slit 12.

The vibrator 2 is fixed on the mounting substrate 17 through the intermediary of the supporting pins 4 which are arranged in a pair. Each supporting pin 4 is made of a wire and has a substantially U-shaped configuration. The supporting pins 4 are bonded at mid portions thereof to portions of the vibrator 2 near two nodes of the vibrator 2, with both ends thereof received and fixed in the supporting-pin receiving holes 13a to 13d.

As understood from FIG. 4, since a part of the slit 12 crosses two straight lines 18 connecting between the two supporting-pin receiving holes 13a–13d, and 13b–13c, respectively, the vibration of the vibrator 2 propagates from the supporting-pin receiving holes 13a to 13d or 13b to 13c along the path 19 which is formed along the portion of the H-shaped slit 12 such that the propagating vibration in the mounting substrate 17 detours around the H-shaped slit 12. Since the distance of the path 19 is greater than the straight line 18 the vibration propagating along the path 19 attenuates to some extent and the interference between the original vibration of the vibrator 12 and the vibration propagated through the mounting substrate 17 is reduced.

The mounting substrate 17 carrying the vibrator 2 is supported and fixed by only the plurality of connecting members 16 at a level above the circuit board 6. One end 16a of each connecting member 16 is fixed to a point on the mounting substrate 17 which is outside the slit 12 and which is substantially in the middle of the path 19. The connecting members 16 are made of a conductive material and electrically connected to the piezoelectric elements 9, 10, and 11 and a body of the vibrator 2 through conductive wiring 22. Alternatively, the connecting members 16 may be connected to a conductive pattern (not shown) formed on the mounting substrate 17 and the conductive pattern may be connected to the piezoelectric elements 9, 10 and 11 and a body of the vibrator 2 through conductive wiring.

The other end 16b of each connecting member 16 is fixed to the circuit board 6 and electrically connected to an oscillation circuit 23 and a detection circuit 24 provided on a rear surface of the circuit board 6.

According to the aforementioned configuration, the end 16a of the connecting member 16 is fixed to the mounting substrate 17 at a position which is farthest from the two supporting pins 4 along the path 19 of propagation of vibration. Since the vibration propagating in the mounting substrate 17 has already attenuated at the portion where the connecting members 16 are attached, the propagation of the vibration to circuit board 6 is reduced. Thus, the vibration leakage which is the phenomenon that the vibration transmitted from the vibrator to the supporting pins is further propagated to the circuit board through the connecting members is also reduced. This suppresses the problem of failure to obtain the expected amplitude of vibration of the vibrator and consequent degradation of performance of the vibrating gyroscope which otherwise may occur due to the vibration leakage.

In addition, since the connecting members 16 provide electrical connection between the wiring (not shown) on the mounting substrate 3 and the circuitry including the oscillation circuit and the detection circuit on the circuit board 6, intermediaries such as a supporting plate and buffer members which are used in known arts are not required, so that the number of parts and steps of the assembly process is reduced.

Although a pillar-like vibrator with a regular-triangular cross-section is employed in the described embodiment, the vibrator may have a different cross-sectional shape such as a square shape.

The substantially H-like configuration of the slit employed in the described embodiment also is illustrative and the invention does not exclude the use of other configurations, provided that the position at which the end of the connecting member is fixed to the mounting substrate is determined in accordance with the slit configuration so as to be substantially in the middle of the path of propagation of vibration between the supporting pins.

Furthermore, although the connecting members used in the described embodiment are tabular members, the invention covers also the cases where connecting members in the form other than tabular form, such as wires, is used as the connecting members, provided that such members can support and fix the mounting substrate.

In the described embodiment, a pair of groups of connecting members are secured to two regions of the mounting substrate so as to oppose to each other. It is to be understood, however, the arrangement may be such that a singular or a plurality of connecting members are secured to only one region on the mounting substrate, and such an arrangement also falls within the scope of the present invention. In such an arrangement, an auxiliary supporting member or members may be used to oppose the connecting member or members so as to cooperate with the connecting members in supporting the mounting substrate. Such auxiliary supporting members need not be electrically conductive.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A vibrating gyroscope comprising:

a vibrator having a pair of spaced nodes of vibration;

a pair of supporting pins secured, respectively, to portions of said vibrator near the nodes of vibration of said vibrator to support said vibrator;

a mounting substrate to which said pair of supporting pins are attached, said mounting substrate having a slit provided through said mounting substrate, said slit providing a longer vibration propagation path between points where said pair of supporting pins are attached than a distance between said points;

a circuit board; and a plurality of connecting members connected at their one ends to said mounting substrate and at their other ends to said circuit board;

wherein said mounting substrate is supported and fixed in spaced relationship with said circuit board by only said plurality of connecting members, each of said connecting members having one end fixed to a point on said mounting substrate substantially in the longitudinal middle of said vibration propagation path.

2. A vibrating gyroscope according to claim 1, wherein said slit has a H-shape.

3. A vibrating gyroscope according to claim 2, wherein said vibrator is pillar-shaped.

4. A vibrating gyroscope according to claim 3, wherein said vibrator has a triangular cross-section.

5. A vibrating gyroscope according to claim 4, wherein said circuit board includes an oscillation circuit for vibrating said vibrator and a detection circuit for detecting angular velocity of rotation of said vibrator.

6. A vibrating gyroscope according to claim 5, wherein said vibrator defines three faces, each having an electrode and wherein the respective one ends of the connecting members are electrically connected to respective electrodes and other ends of the connecting member are electrically connected to either the oscillation circuit or the detection circuits.

* * * * *